United States Patent [19]

Weisgerber

[11] 4,145,124
[45] Mar. 20, 1979

[54] SCREW FOR EYE GLASS FRAMES

[76] Inventor: William C. Weisgerber, 3316 Savage Rd., Sarasota, Fla. 33581

[21] Appl. No.: 798,454

[22] Filed: May 19, 1977

Related U.S. Application Data

[63] Continuation-in-part of Ser. No. 667,210, Mar. 15, 1976, abandoned.

[51] Int. Cl.² .......................... G02C 5/14; G02C 5/00; F16B 23/00
[52] U.S. Cl. .................................. 351/121; 351/141; 16/128 A; 403/359
[58] Field of Search .................... 351/121, 141, 153; 151/41.73; 16/128 A, 159; 15/41.73; D8/264, 267; 403/152, 154, 282, 359

[56] References Cited

U.S. PATENT DOCUMENTS

| 519,411 | 5/1894 | North et al. | 151/41.73 |
| 2,004,561 | 6/1935 | Becker et al. | 403/152 X |
| 3,029,697 | 4/1962 | Okner | 351/153 X |

OTHER PUBLICATIONS

Parker-Kalon, Machine Design, (Fasteners Book Issue), 3/21/63, p. 310.

Primary Examiner—Paul A. Sacher
Assistant Examiner—Rodney B. Bovernick
Attorney, Agent, or Firm—Stein & Frijouf

[57] ABSTRACT

This invention relates to a new and useful screw for joining together the temple pieces of eye glass frames to the front lens holding frame. The invention comprises a serrated tapered screw suitable for insertion into a hinge that connects the temple piece to the front frame of a pair of eye glasses.

9 Claims, 7 Drawing Figures

SCREW FOR EYE GLASS FRAMES

CROSS-REFERENCE TO RELATED APPLICATIONS

This is a continuation-in-part of a prior application Ser. No. 667,210 filed Mar. 15, 1976, now abandoned.

BACKGROUND OF THE INVENTION

1. Field of the Invention

This invention relates to a connector element including a screw structure designed to be inserted into a hinge for joining together the temple pieces of eye glass frames to the front lens holding frame.

2. Description of the Prior Art

One problem encountered with a screw and hinge assembly used for joining together the temple pieces of eye glass frames to the front lens holding frame is that the screw often works itself free from the hinge. The loosening of the screw within the hinge is greatly facilitated by the temple pieces being constantly opened and closed against the front frame. The loosening of the screw from the hinge will cause the glasses to easily slip down over the wearer's nose and eventually can lead to the temple piece separating from the front frame of the eye glasses.

In order to counteract the tendency of eye glass screws to work loose, the screw must be very precisely machined in order to fit the apertures in the hinges. This fine machining adds to the cost and possibilities of defective screw and hinge assemblies.

Thus, a need exists for an effective screw and hinge assembly for joining together the temple pieces of eye glass frames to the front lens holding frame without the screw loosening from the hinge with continued use.

SUMMARY OF THE INVENTION

The present invention relates to a new and useful screw and hinge assembly for eyeglasses which inhibits the loosening and/or separation of the temple piece from the front frame. Such loosening is commonly caused by the continuous opening and closing of the temple piece relative to the front frame. In particular, the invention comprises a serrated tapered screw with a hinge configured to receive the screw.

The serrated tapered screw comprises a shank and a head. The shank has a threaded portion and a serrated portion with the serrated portion being disposed between the head and the threaded portion. When the screw is in protruding disposition within the hinge, the serrations tightly engage the inner aperture walls to resist loosening of the screw from the hinge.

More particularly, the screw in the present invention comprises a shank which is tapered, so as to avoid the problem of having an aperture that does not precisely fit the diameter of the shank of the screw being inserted therein. Since the shank of the screw must tightly fit against the aperture walls of the hinge to avoid loosening, normally the shank would have to be perfectly machined to fit therein. However, the tapering of the shank will allow for substantial variation between the diameters of the hinge apertures and the diameter of the screw. Therefore, a much wider tolerance can be accepted in the machining of both the hinge and the screw, resulting in a less expensive and more reliable hinge and screw assembly.

Therefore, through the use of a serrated tapered screw, the tension between the temple piece and the front frame is maintained regardless of extensive use of the glasses and excessive relative movement between the temple pieces and the front frame.

This invention accordingly comprises an apparatus possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
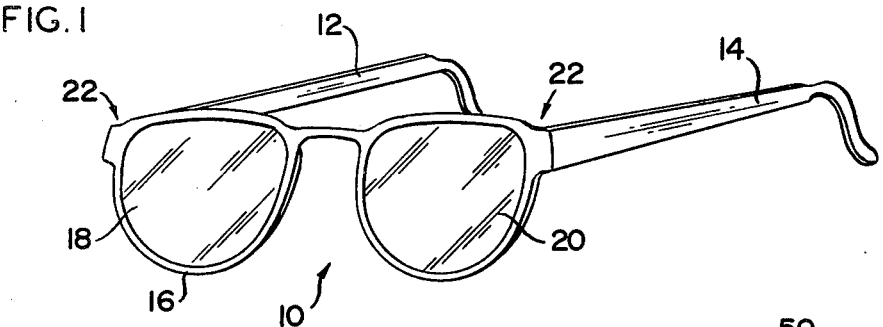
FIG. 1 illustrates in perspective a pair of eye glasses.
Figure 2:
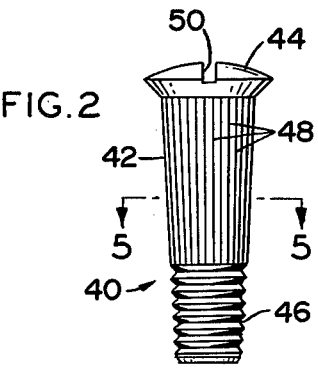
FIG. 2 is a front view of the tapered screw.
Figure 4:
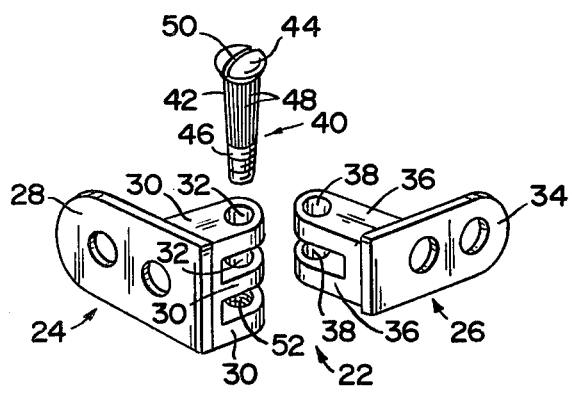
FIG. 4 is an exploded perspective view in detail of the hinge between the temple piece and the front frame.
Figure 5:
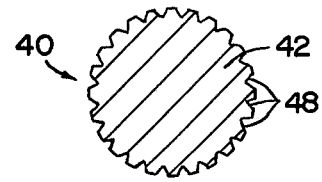
FIG. 5 is a cross-sectional view of the tapered screw along line 5—5 of FIG. 2.
Figure 3:
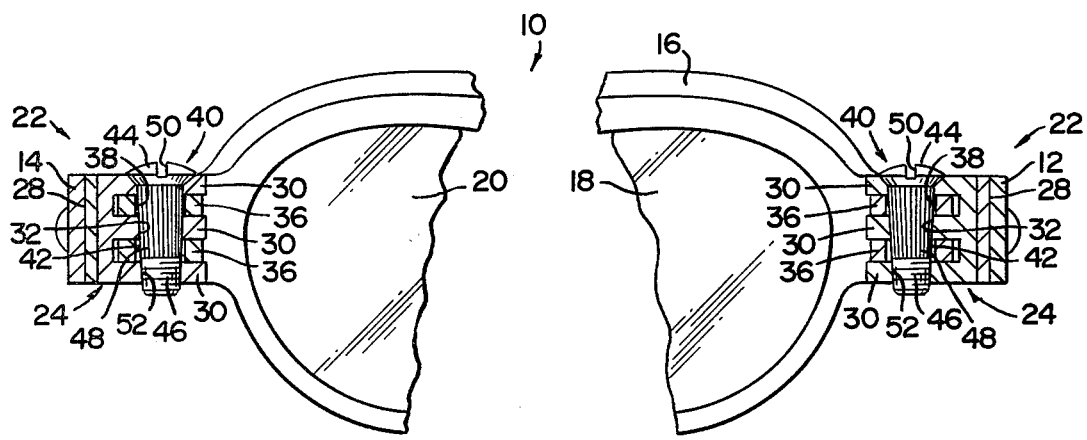
FIG. 3 is a fragmentary view of the glasses of FIG. 1 as viewed from the rear and shown partly broken away and in section.

FIG. 1 illustrates a pair of eye glasses, generally indicated as 10 having a right temple piece 12, a left temple piece 14 and a front frame 16. The front frame 16 is suitable for holding a pair of lenses 18 and 20. Hinge means 22 is illustrated in FIG. 4. Hinge means 22 comprises first and second hinge members indicated generally as 24 and 26 respectively. First hinge member 24 has a face 28 suitable for attaching to either temple piece 12 or 14 by methods well known in the art. A plurality of first finger portions 30 are integral with the face 28, and are preferably positioned substantially 90° to the face 28. The finger portions 30 have first aperture means 32 formed therein. In the preferred embodiment, three finger portions 30 are shown. However, any number of finger portions could be utilized. No matter how many finger portions 30 are present with first hinge member 24, the lower finger portion 30 as shown in FIG. 4, contains a first aperture means 32 having threaded internal surface portions 52. The first aperture means 32 may be tapped or may be substantially uniform in diameter.

Second hinge member 26 is similar to first hinge member 24. The second hinge member 26 has a face 34 suitable for attaching to the frame 16 by methods well known in the art. A plurality of second finger portions 36 are integral with the face 34 and established substantially perpendicular thereto. Second finger portions 36 have second aperture means 38 formed therein. In the present embodiment as shown in FIG. 4, two second finger portions 36 are shown included in the structure of hinge member 26. However, any number of second finger portions 36 could be used. The second hinge aperture means 38 are so positioned that their centers are disposed along the center line of apertures 32 in fingers 30. All the second hinge aperture means 38 of the second hinge member 26 are preferably unthreaded.

The finger portions 30 and 36 have spaces therebetween, the spaces being sufficient to enable the first finger portions 30 to nest in the spaces between the second finger portions 36 and likewise, the second finger portions 36 can nest in the spaces between the first finger portions 30. This allows for the hinge aperture means of each of the plurality of finger portions 30 and 36 to be in line with each other to receive screw means 40, which hereinafter is described. The faces 28 and 34 are attached to the temple piece 12 and the front frame 16 respectively, by one of the many means known in this art.

The screw means 40 comprises shank portion 42 and a head portion 44. The head portion 44 has a slot 50 suitable for receiving the head of a screwdriver. The shank portion has a threaded screw portion 46 and a serrated screw portion 48, the serrated screw portion being disposed between the head portion 44 and the threaded screw portion 46. The serrated screw portion 48 consists of serrated V-shaped indentations made longitudinally down the exterior surface of shank portion 42. The lower first aperture means 32, the threaded screw portion 46 and the serrated screw portion 48 are all machined by means well known in the art for receiving the screw means 40. The screw means 40 has a length sufficient to extend through the finger portions 30 and 36 and to engage the threaded hinge portion 52. The threaded screw portion 46 is machined so that the angle of the thread is approximately ½°.

The screw means 40 is inserted into the hinge aperture portion 32 and 38 and engages the threaded hinge portion 52. The screw means is tapered about 3° from the head portion 44 to the end of the shank portion 42. This allows for a wider tolerance in the machining of the aperture means 32 relative to the shank portion. As the threaded screw portion 46 rotates into the corresponding threaded portion 52 of hinge member 24, serrated screw portion 48 will tightly engage the walls of the hinge aperture portions 32 to secure screw means 40 relative to the first hinge member 24. Hinge aperture means 38 is established to freely rotate about screw means 40. The tapering of screw means 40 inhibits the binding of the screw means upon the normal opening and closing of the temple pieces against the front frame. It is understood that the machining of the tapered screw means 40 may vary, including the tapering, without deviating from the spirit and scope of the present invention. These dimensions and percentages are preferable, but are not critical to the present invention and thereby making possible the use of various thread sizes and angles. Likewise, the machining of various thread sizes and angles. Likewise, the machining of the threaded aperture portion 52 and the threaded screw portion 46 can vary in the manner in which they are machined. It is preferable that the screw means 40 be machined with a metric thread. However, a conventional thread can be readily used without deviating from the spirit and scope of this invention.

Figure 6:
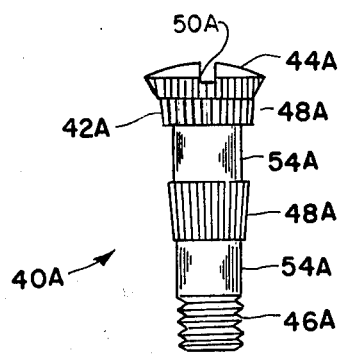
FIG. 6 is a front view of a variation of the tapered screw shown in FIG. 2.
Figure 7:
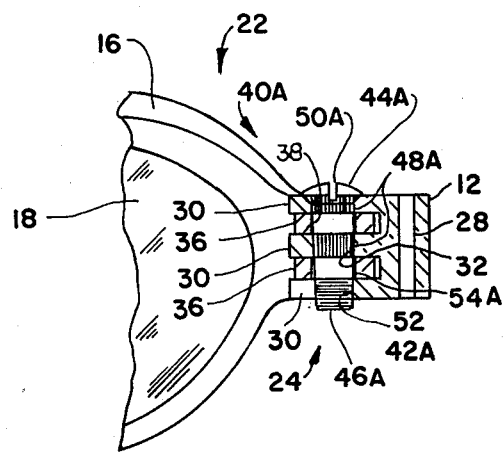
FIG. 7 is a fragmentary view of the glasses of FIG. 1 as viewed from the rear and shown partially broken away and in section incorporating the screw of FIG. 6.

FIG. 6 illustrates a variation of the screw means 40 shown in FIGS. 2-5 and comprises a screw means 40A having a shank portion 42A and a head portion 44A. The head portion 44A has a slot 50A suitable for receiving the head of a screwdriver or the like. The shank portion 42A has a threaded screw portion 46A and plural serrated screw portions 48A. The serrated screw portions 48A are disposed between the head portion 44A and the threaded screw portion 46A. The shank portion 42A also includes smooth shank portions 54A one being interposed between the two serrated screw portions 48A and the other being interposed between the serrated screw portions 48A and the threaded screw portion 46A. The smooth shank portions 54A have a substantially constant diameter which diameter is less than the smallest diameter of the serrated screw portion 48A of the screw means 40A. The screw 40A may be fashioned from the screw 40 shown in FIGS. 2 and 5 by removing material to form the smooth shank portions 54A by a turning or molding process.

As can be readily appreciated, the screw means 40A shown in FIG. 6 is applicable to the hinge structure shown in FIGS. 1, 3 and 4 and 7. The screw means 40A is inserted into the hinge aperture portion 32 and 38 and engages the threaded hinge portion 52. The serrated screw portions 48A are tapered approximately three degrees from the head portion 44A to the end or shank portion 42A. This configuration allows for wider tolerance in the machinery of the aperture means relative to the shank portions. As the threaded screw portion 46A rotates into the threaded portion 52 of hinge member 24, the serrated screw portions 48A will tightly engage the walls of the hinge aperture portions 32 of first fingers 30 while allowing the second finger portions 36 to freely rotate relative to the smooth shank portions 54A thus inhibiting binding of the screw means 40 upon the normal opening and closing of the temple piece against the front frame. Although the improved screw 40A has been shown to have plural smooth shank portions 54A it is understood that a single smooth shank portion 54A may be interposed between plural serrated screw portions or interposed between a single serrated screw portion and the threaded screw portion 46A depending upon the configuration of eye glass frames utilized.

It should be understood that the invention heretofor described may be incorporated in both a left handed threaded screw or a right handed threaded screw. In some applications, a right and a left handed threaded screw may both be incorporated into respective sides of an eye glass frame.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

Now that the invention has been described:

What is claimed is:

1. A screw and hinge assembly for fastening an eye glass temple piece to a front eye glass frame, said screw and hinge assembly comprising: hinge means including first and second hinge members, said first hinge member affixed to the temple piece, said second hinge member affixed to the front eye glass frame, screw means having a screw head portion and a screw shank portion integrally attached to one another, said screw shank portion having a threaded screw portion and a serrated screw portion integrally formed in the exterior surface thereof, said serrated screw portion having a taper between said screw head portion and said threaded screw portion, at least one first aperture means formed within said first hinge member and configured to receive said screw means, at least one second aperture means formed within said second hinge member and configured to receive said screw means, said screw means disposed to extend concurrently into both said first aperture means and said second aperture means whereby said first hinge member and said second hinge member are secured in movable, mating engagement with one another, said serrated portion disposed in locking engagement with the walls of one of said first and second aperture means whereby said screw means cannot work itself loose from said hinge means.

2. A screw and hinge assembly as in claim 1, wherein said first hinge member further comprises a plurality of first finger portions formed thereon and disposed in protruding relationship therefrom, each of said first finger portions having said first aperture means formed therein, said second hinge member further comprises a plurality of second finger portions formed thereon and disposed in protruding relation therefrom, each of said second finger portions having said second aperture means formed therein, said first aperture means disposed in aligned non-overlapping relation to said second aperture means, said screw shank means disposed in inserted, protruding relationship through said plurality of first and second finger portions.

3. A screw and hinge assembly as in claim 2, wherein one of first finger portions disposed at the substantial end of said first hinge member has hinge threads formed within said first aperture means, said hinge threads disposed in engaging relationship to said threaded screw portion.

4. A screw and hinge assembly as in claim 1, wherein said serrated portion is disposed in locking engagement with the walls of said first aperture means.

5. A screw and hinge assembly as in claim 1, including a substantially smooth shank portion interposed between said serrated screw portion and said threaded screw portion.

6. A screw and hinge assembly as in claim 5, wherein said smooth shank portion has a diameter less than the minimum diameter of said serrated screw portion.

7. A screw and hinge assembly as set forth in claim 5, wherein said smooth shank portion is established to cooperate with only said second aperture means of said second hinge member.

8. A screw and hinge assembly as set forth in claim 7, wherein said serrated screw portions is established to cooperate with only said first aperture means of said first hinge member.

9. A screw and hinge assembly as set forth in claim 6, wherein said smooth shank portion includes a substantially uniform diameter.

* * * * *